Patented Jan. 3, 1933

1,893,244

UNITED STATES PATENT OFFICE

BERNHARD RICHARD, OF BASEL, SWITZERLAND, ASSIGNOR TO THE FIRM J. R. GEIGY S. A., OF BASEL, SWITZERLAND

MANUFACTURE OF MONOAZO-DYESTUFFS

No Drawing. Application filed October 3, 1929, Serial No. 397,159, and in France October 15, 1928.

This invention relates to the manufacture of new valuable monoazo-dyestuffs by combining a diazo-compound of an aryl- or aralkyl-ether of ortho-amino-phenol or of a substitution product thereof with an N-arylsulpho-1-amino-8-naphthol-disulphonic acid. The new dyestuffs dye wool and silk extremely clear red shades, very fast to light and to fulling. They dissolve in water with red to blue-red and in concentrated sulphuric acid with violet to blue coloration.

The following examples illustrate the invention:—

Example 1

A diazo-solution prepared in the usual manner from 18.5 kilos of ortho-amino-diphenyl ether of the formula

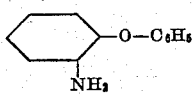

is introduced, at a temperature of 0–5° C., into an aqueous solution containing 47.3 kilos of para-toluene-sulpho-1-amino-8-naphthol-3:6-disulphonic acid of the formula:

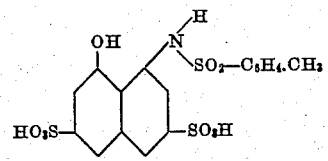

and 30 kilos of sodium acetate. The reaction mixture is maintained neutral by the addition, from time to time, of a solution of sodium carbonate. After the whole has been stirred from 6-8 hours longer, coupling is complete, whereupon the whole is heated and the dyestuff precipitated by the addition of common salt, filtered and dried. It is a red powder which dissolves in water to a bluish-red solution and in concentrated suphuric acid to a violet solution. It dyes wool and silk clear bluish-red shades of very good fastness to light and to fulling. In its free state the dyestuff has most probably the following formula:

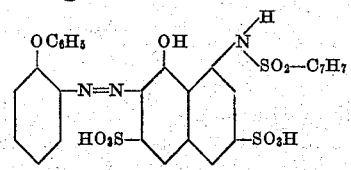

Instead of the ortho-amino-diphenyl ether used in the foregoing example, there may be used another aryl-ether of ortho-aminophenol or of a derivative thereof, for example ortho-aminophenyl-ortho-tolyl ether or ortho-aminophenyl-meta-tolyl ether, ortho-aminophenyl-para-tolyl ether, ortho-aminophenyl-para-chlorophenyl ether, ortho-aminophenyl-ortho-chlorophenyl ether, ortho-amino-para-chlorodiphenyl ether, ortho-aminophenyl-benzyl ether, meta-amino-para-cresol-benzyl ether, 4-chloro-2-aminophenyl-benzyl ether or the like.

Instead of the para-toluenesulpho-1-amino-8-naphthol-disulphonic acid, there may be used any other N-arylsulpho-1:8-aminonaphthol-disulphonic acid, for example benzene-sulpho-, chlorobenzene-sulpho-, nitrobenzene-sulpho-1:8-aminonaphthol-3:6-or-4:6-disulphonic acid.

Example 2

A diazo-solution obtained in the usual manner from 23.4 kilos of 4-chloro-2-aminophenyl-benzyl-ether of the formula:

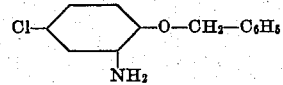

is introduced into an aqueous solution containing 46 kilos of benzenesulpho-1:8-aminonaphthol-3:6-disulphonic acid of the formula:

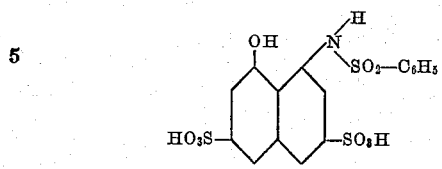

and 25 kilos of sodium acetate, a solution of sodium carbonate being slowly added in order to maintain a neutral reaction. The whole is stirred for 6–8 hours, after which coupling is complete and the dyestuff is precipitated by the addition of common salt. When dry it is a brick red powder, which dissolves in water to a bluish-red solution and in concentrated sulphuric acid to a blue solution. It dyes wool and silk extremely clear bluish-red shades, the dyeings on wool being very fast to fulling and to light. In its free state the dyestuff has most probably the following formula:

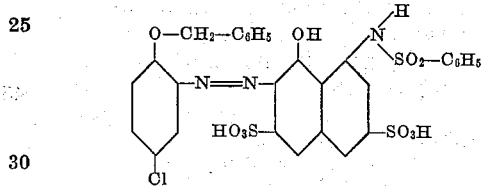

Instead of the benzyl ether of 4-chloro-2-aminophenol used in this example, there may be used the benzyl ether or the chlorobenzyl ether of ortho-aminophenol or of other derivatives of this compound; instead of the benzenesulpho-1:8-aminonaphthol-3:6-disulphonic acid there may be used the corresponding toluene-sulpho-1:8-aminonaphthol-3:6-disulphonic acid or another arylsulpho-1:8-aminonaphthol-3:6-disulphonic acid.

Dyestuffs may be made from an arylsulpho-1:8-aminonaphthol-4:6-disulphonic acid (K acid) in a manner similar to that described in the foregoing examples. They yield red dyeings which are more yellow than those of the corresponding dyestuffs from the aryl-sulpho-1:8-aminonaphthol-3:6-disulphonic acids.

What I claim is:—

1. A process for the manufacture of monoazo-dyestuffs, consisting in coupling a diazo compound of an ortho-aminophenol-ether of the following formula:

wherein R stands for phenyl, tolyl, benzyl or halogen substitution products and Y for H, Cl and $CH_3$, with an N-benzene-sulpho-derivative of a 1-amino-8-naphthol-disulphonic acid of the formula:

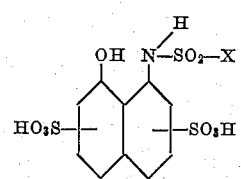

wherein X stands for $C_6H_5$, $C_7H_7$, or $C_6H_4Cl$.

2. A process for the manufacture of monoazo-dyestuffs, consisting in coupling a diazo compound of an ortho-aminophenol-benzylether with an N-benzene-sulpho-derivative of a 1-amino-8-naphthol-disulphonic acid of the formula:

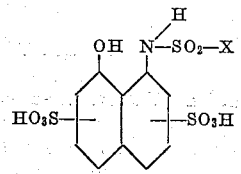

wherein X stands for $C_6H_5$, $C_7H_7$, or $C_6H_4Cl$.

3. A process for the manufacture of monoazodyestuffs, consisting in coupling a diazo compound of 4-chloro-2-amino-phenol-benzylether with an N-benzene-sulpho-derivative of a 1-amino-8-naphthol-disulphonic acid of the formula

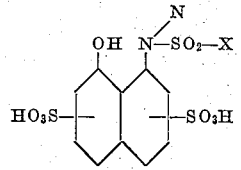

wherein X stands for $C_6H_5$, $C_7H_7$, or $C_6H_4Cl$.

4. A process for the manufacture of monoazo-dyestuffs, consisting in coupling a diazo compound of a phenylether of the ortho-aminophenol with a toluene-sulpho-1.8-aminonaphthol-disulphonic acid.

5. A process for the manufacture of monoazo-dyestuffs, consisting in coupling a diazo compound of a phenylether of the ortho-aminophenol with a toluene-sulpho-1.8-aminonaphthol-3.6-disulphonic acid.

6. A process for the manufacture of monoazo-dyestuffs, consisting in coupling a diazo compound of an ortho-aminophenol-benzylether with a toluene-sulpho-1.8-aminonaphthol-disulphonic acid.

7. A process for the manufacture of monoazo-dyestuffs, consisting in coupling a diazo compound of 4-chloro-2-aminophenol-benzylether with a toluene-sulpho-1:8-aminonaphthol-disulphonic acid.

8. A process for the manufacture of monoazo-dyestuffs, consisting in coupling a diazo compound of 4-chloro-2-amino-phenol-benzylether with a toluene-sulpho-1:8-aminonaphthol-3:6-disulphonic acid.

9. The monoazo-dyestuffs of the formula:

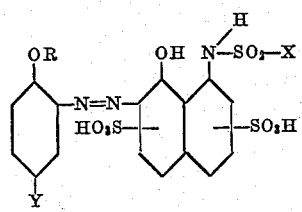

wherein R stands for phenyl, tolyl, benzyl or halogen substitution products, Y for H, Cl and $CH_3$ and X for $C_6H_5$, $C_7H_7$, or $C_6H_4Cl$, said dyestuffs dissolving in water with red to blue-red and in concentrated sulphuric acid with violet to blue coloration and dyeing wool and silk clear red shades very fast to light and fulling.

10. The monoazo-dyestuffs having the formula:

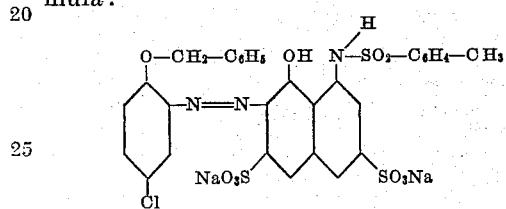

said dyestuff dissolving in water with red to blue red and in concentrated sulphuric acid with blue coloration and dyeing wool and silk clear red shades very fast to light and fulling.

In witness whereof I have hereunto signed my name this 21st day of September, 1929.

BERNHARD RICHARD.